US010122447B2

(12) United States Patent
Takahashi et al.

(10) Patent No.: US 10,122,447 B2
(45) Date of Patent: Nov. 6, 2018

(54) FREE SPACE OPTICAL RECEIVER AND FREE SPACE OPTICAL RECEIVING METHOD

(71) Applicant: NEC Corporation, Minato-ku, Tokyo (JP)

(72) Inventors: Seigo Takahashi, Tokyo (JP); Toshiharu Ito, Tokyo (JP); Kohei Hosokawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 16 days.

(21) Appl. No.: 15/123,103

(22) PCT Filed: Mar. 13, 2014

(86) PCT No.: PCT/JP2014/001428
§ 371 (c)(1),
(2) Date: Sep. 1, 2016

(87) PCT Pub. No.: WO2015/136572
PCT Pub. Date: Sep. 17, 2015

(65) Prior Publication Data
US 2017/0070289 A1    Mar. 9, 2017

(51) Int. Cl.
*H04B 10/11* (2013.01)
*H04B 10/112* (2013.01)
(Continued)

(52) U.S. Cl.
CPC ......... *H04B 10/1121* (2013.01); *H04B 10/60* (2013.01); *H04J 14/02* (2013.01)

(58) Field of Classification Search
CPC ....... H04B 10/1121; H04B 10/60; H04J 14/02
(Continued)

(56) References Cited

U.S. PATENT DOCUMENTS 6,107,617 A * 8/2000 Love .................. G01J 9/00
                                              250/201.9
6,792,185 B1   9/2004 Ahrens et al.
(Continued)

FOREIGN PATENT DOCUMENTS

JP    2001-298422 A    10/2001
JP    2003-124890 A     4/2003
(Continued)

OTHER PUBLICATIONS

Zhao et al, Turbulence Mitigation Scheme for Optical Communications using Orbital Angular Momentum Multiplexing Based on Channel Coding and Wavefront Correction, Jan. 2014, Cornell University Library, All Document.*
(Continued)

*Primary Examiner* — Ken N Vanderpuye
*Assistant Examiner* — Dibson Sanchez

(57) ABSTRACT

It is impossible to prevent the deterioration of the coupling efficiency between received light and a single mode fiber, and difficult to achieve a higher transmission rate, with respect to a free space optical communication receiver; therefore, a free space optical receiver according to an exemplary aspect of the present invention includes light collecting means for collecting laser light having propagated through a free space transmission path; mode controlling means for separating the laser light collected by the light collecting means into a plurality of propagation mode beams depending on a wave-front fluctuation of the laser light and outputting the propagation mode beams; a plurality of single mode transmission media for guiding the plurality of propagation mode beams, respectively; and a plurality of light receiving means for receiving the plurality of propagation mode beams respectively through the plurality of single mode transmission media.

17 Claims, 10 Drawing Sheets

(51) Int. Cl.
*H04B 10/60* (2013.01)
*H04J 14/02* (2006.01)

(58) Field of Classification Search
USPC .................................................. 398/118–131
See application file for complete search history.

(56) References Cited

U.S. PATENT DOCUMENTS

| | | | | |
|---|---|---|---|---|
| 7,197,248 | B1* | 3/2007 | Vorontsov | H04B 10/1127 398/119 |
| 8,244,137 | B1* | 8/2012 | Chen | H04B 10/1141 398/118 |
| 9,048,950 | B2 | 6/2015 | Chen et al. | |
| 9,077,577 | B1* | 7/2015 | Ashrafi | H04L 27/362 |
| 9,294,146 | B2* | 3/2016 | Mumtaz | H04B 10/2581 |
| 9,479,285 | B2* | 10/2016 | Djordjevic | H04J 14/04 |
| 9,559,782 | B2* | 1/2017 | Koebele | H04B 10/2581 |
| 9,712,242 | B2* | 7/2017 | Rapp | H04B 10/2581 |
| 9,733,108 | B2* | 8/2017 | Cvijetic | G01D 5/34 |
| 9,780,872 | B2* | 10/2017 | Ren | H04B 10/1123 |
| 2002/0196506 | A1* | 12/2002 | Graves | H04B 10/1125 398/126 |
| 2003/0001073 | A1 | 1/2003 | Presby et al. | |
| 2003/0062468 | A1* | 4/2003 | Byren | F41H 13/0043 250/216 |
| 2004/0161239 | A1* | 8/2004 | Bruesselbach | H04B 10/112 398/131 |
| 2005/0006559 | A1* | 1/2005 | Smith | G01J 1/4257 250/201.9 |
| 2005/0045801 | A1* | 3/2005 | Smith | G01J 9/00 250/201.9 |
| 2005/0196170 | A1 | 9/2005 | Winsor | |
| 2006/0024061 | A1* | 2/2006 | Wirth | H04B 10/1125 398/129 |
| 2006/0076473 | A1* | 4/2006 | Wilcken | H04B 10/1121 250/214 A |
| 2007/0229993 | A1* | 10/2007 | Hemmati | G02B 23/06 359/846 |
| 2008/0267559 | A1* | 10/2008 | De Barros | G02B 6/02023 385/28 |
| 2010/0329670 | A1* | 12/2010 | Essiambre | H04B 10/2581 398/43 |
| 2010/0329693 | A1 | 12/2010 | Chen | |
| 2012/0008961 | A1 | 1/2012 | Chen et al. | |
| 2012/0177065 | A1* | 7/2012 | Winzer | H04B 10/2581 375/295 |
| 2012/0224861 | A1* | 9/2012 | Winzer | H04B 10/2581 398/143 |
| 2013/0071105 | A1* | 3/2013 | Chang | G01S 13/9303 398/25 |
| 2013/0148963 | A1* | 6/2013 | Cvijetic | H04B 10/2581 398/45 |
| 2013/0235744 | A1* | 9/2013 | Chen | H04L 47/82 370/252 |
| 2014/0126902 | A1* | 5/2014 | Swanson | H04J 14/00 398/43 |
| 2014/0199066 | A1* | 7/2014 | Martelli | H04B 10/2581 398/44 |
| 2014/0209798 | A1* | 7/2014 | Woodward | G02B 6/04 250/227.28 |
| 2014/0270565 | A1* | 9/2014 | Poyneer | G06T 5/003 382/260 |
| 2015/0030325 | A1* | 1/2015 | Chang | H04B 10/2581 398/44 |
| 2015/0229438 | A1* | 8/2015 | Le Taillandier De Gabory | H04B 10/2581 398/182 |
| 2015/0349910 | A1* | 12/2015 | Huang | H04J 14/04 398/44 |
| 2016/0028479 | A1* | 1/2016 | Ren | H04B 10/1123 398/43 |
| 2016/0033406 | A1* | 2/2016 | Ashrafi | G01N 21/17 356/432 |
| 2016/0123877 | A1* | 5/2016 | Cvijetic | G01S 17/89 356/300 |
| 2016/0204896 | A1* | 7/2016 | Yu | H04J 14/086 398/65 |
| 2017/0322152 | A1* | 11/2017 | Ashrafi | G01N 21/17 |
| 2017/0331543 | A1* | 11/2017 | Hirabe | H04B 7/0682 |
| 2017/0343750 | A1* | 11/2017 | Ashrafi | G02B 6/43 |
| 2017/0353241 | A1* | 12/2017 | Fazal | H04B 10/2504 |
| 2018/0067045 | A1* | 3/2018 | Ashrafi | G01N 21/59 |

FOREIGN PATENT DOCUMENTS

| | | |
|---|---|---|
| JP | 2006-333070 A | 12/2006 |
| JP | 2007-526717 A | 9/2007 |
| JP | 2009-147448 A | 7/2009 |
| JP | 2013-535871 A | 9/2013 |

OTHER PUBLICATIONS

Zhu et al, Analysis and Suppression of Interference and Noise in FSO, 2009, SPIE, All Document.*

Djordjevic et al, Energy Efficient Free-Space Optical Communication by Coded OAM Modulation, 2011, IEEE, All Document.*

Wang et al, Terabit free space data transmission employing Orbital angular momentum multiplexing, Jun. 2012, Nature Photonics, All Document.*

Huang et al, 100 Tbit per sec free space data link enabled by three dimensional multiplexing of orbital angular momentum, polarization, and wavelength. Jan. 2014, Optics Letters, All Document.*

Extended European Search Report for EP Application No. EP14885618.0 dated Sep. 27, 2017.

International Search Report for PCT Application No. PCT/JP2014/001428, dated Jun. 3, 2014.

English translation of Written opinion for PCT Application No. PCT/JP2014/001428.

* cited by examiner

FREE SPACE OPTICAL RECEIVER AND FREE SPACE OPTICAL RECEIVING METHOD

This application is a National Stage Entry of PCT/JP2014/001428 filed on Mar. 13, 2014, the contents of which is incorporated herein by reference, in its entirety.

TECHNICAL FIELD

The present invention relates to free space optical receivers and a free space optical receiving methods, in particular, to a free space optical receiver and a free space optical receiving method to perform optical communication using a laser light beam propagating through a free space.

BACKGROUND ART

In recent years, by the development of remote sensing technologies, observational instruments mounted in aircraft and artificial satellites have grown in performance, and the amount of information transmitted from the air to the ground is increasing. In order to cope with further performance improvement of the observational instruments in the future, data communication technologies that use free space optics (FSO) have been aggressively studied that uses optical frequency bands unconstrained by radio frequency bands. The achievement of the high-capacity free space optics (FSO) requires a high-speed technology for a transmission rate and a wavelength multiplexing technology. In this case, it is efficient to use a common technology with an optical fiber communication technology, that is, to apply an optical transmitting and receiving technology using a single mode fiber (SMF).

Examples of a free space optical communication device using the optical fiber communication technology are described in Patent Literature 1 and Patent Literature 2.

In the free space optics (FSO) technology, it is general to make a modulated laser beam with a narrow beam to propagate through the air. On the receiving side, light beams are collected by an optical antenna and propagate through a short-range fiber, and then signal reception is performed.

In a free space optics (FSO) receiver, a wave-front distortion of laser light due to atmospheric propagation becomes a problem as described below. A beam spot is formed on a focal plane in a collecting unit of the free space optics (FSO) receiver, and a speckle pattern arises on the beam spot due to an atmospheric disturbance. By the occurrence of the speckle pattern, the beam spot diffuses or moves (scintillation) against an ideal focal plane.

In the free space optics (FSO) receiver, optical coupling with a single mode fiber (SMF) is required as a bit rate of a signal increases; however, the above-described phenomenon of beam spot variation becomes a serious problem because it brings deterioration of the coupling efficiency. The reason is that the speckle pattern has a relatively significant impact on the single mode fiber (SMF) having a small core diameter; accordingly, the loss of received data occurs due to a slight scintillation, and an effective communication rate decreases.

In order to prevent the deterioration of the coupling efficiency with the single mode fiber (SMF) described above, the free space optical communication device described in Patent Literature 1 is configured to use a fiber cable bundling a plurality of optical fibers tightly, for example, an optical fiber bundle. Specifically, the free space optical communication device described in Patent Literature 1 includes a precise acquisition and tracking function section having a convex lens as a light collection optical system into which the light beam from a communication opposite station received by a transmitting and receiving telescope is introduced, and a fiber cable bundling a plurality of optical fibers tightly. The precise acquisition and tracking function section forms a light focus of the light beam having been transmitted through the convex lens on a light transmission/reception surface of one end of the fiber cable where ends of first to n-th optical fibers are exposed, and couples the incident light with at least one of the optical fibers. This makes a configuration in which the received light is guided through any one of the first to n-th optical fibers.

Patent Literature 2 discloses a FSO receiver that uses a single fiber tapered from a large core to a small core instead of a fiber bundle. Specifically, the FSO receiver described in Patent Literature 2 includes a telescopic collection system, a wavelength demultiplexer, photodetectors, analog-to-digital converters, and a digital signal processor. The FSO receiver has a configuration in which a tapered fiber bundle or a tapered single fiber collects light from the demultiplexer into a plurality of individual fiber endfaces and concentrates it into a single output fiber for input to the photodetector.

By this means, a relatively large optical aperture is provided for collecting the optical signal. Thus, there are known tapered fiber bundles that employ an adiabatic taper to efficiently couple the collected light into a single-mode output fiber for efficient detection. It is said that one benefit of the large aperture that is afforded by the above-described technique is greater tolerance to beam wander which tends to degrade the performance of the communication system.

CITATION LIST

Patent Literature

[PTL 1] Japanese Unexamined Patent Application Publication No. 2006-333070 (paragraphs [0019] to [0043], FIG. 1 and FIG. 2)
[PTL 2] Japanese Unexamined Patent Application Publication (Translation of PCT Application) No. 2013-535871 (paragraphs [0013] to [0032], FIG. 2 and FIG. 3)

SUMMARY OF INVENTION

Technical Problem

In the above-mentioned free space optical communication device described in PTL 1, an optical signal illuminating a clad of an individual fiber included in the optical fiber bundle is not received and results in a loss. Since the ratio of the area of a clad to the area of a core is less than small, the above-mentioned loss is not negligible. Accordingly, the configuration using the optical fiber bundle has the problem that it is difficult to prevent the deterioration of the coupling efficiency with the single mode fiber (SMF).

In the above-mentioned FSO receiver described in Patent Literature 2, if the periphery of a large core in a single fiber is illuminated with coherent signal light, high-order modes are excited in a fiber with a large core region. At this time, the high-order modes that cannot propagate through a following single mode fiber (SMF) become a radiation loss in the adiabatic taper. Therefore, there is the problem that it is impossible to prevent losses associated with migration of a beam spot from arising even though the FSO receiver described in Patent Literature 2 is used.

As mentioned above, there has been the problem that it is impossible to prevent the deterioration of the coupling efficiency between received light and a single mode fiber (SMF), and difficult to achieve a higher transmission rate, with respect to a free space optical communication receiver.

The object of the present invention is to provide a free space optical receiver and a free space optical receiving method that solve the above-mentioned problem that it is impossible to prevent the deterioration of the coupling efficiency between received light and a single mode fiber, and difficult to achieve a higher transmission rate, with respect to a free space optical communication receiver.

Solution to Problem

A free space optical receiver according to an exemplary aspect of the present invention includes light collecting means for collecting laser light having propagated through a free space transmission path; mode controlling means for separating the laser light collected by the light collecting means into a plurality of propagation mode beams depending on a wave-front fluctuation of the laser light and outputting the propagation mode beams; a plurality of single mode transmission media for guiding the plurality of propagation mode beams, respectively; and a plurality of light receiving means for receiving the plurality of propagation mode beams respectively through the plurality of single mode transmission media.

A free space optical receiving method according to an exemplary aspect of the present invention includes collecting laser light having propagated through a free space transmission path; separating the laser light having collected into a plurality of propagation mode beams depending on a wave-front fluctuation of the laser light; introducing the plurality of propagation mode beams respectively into a plurality of single mode transmission media; and receiving respectively the plurality of propagation mode beams having propagated through the plurality of single mode transmission media.

Advantageous Effects of Invention

According to a free space optical receiver and a free space optical receiving method of the present invention, it is possible to effectively reduce the deterioration of the coupling efficiency between received light and a single mode fiber, and to achieve a higher transmission rate.

DESCRIPTION OF EMBODIMENTS

Exemplary embodiments of the present invention will be described below with reference to the drawings.

A First Exemplary Embodiment

Figure 1:
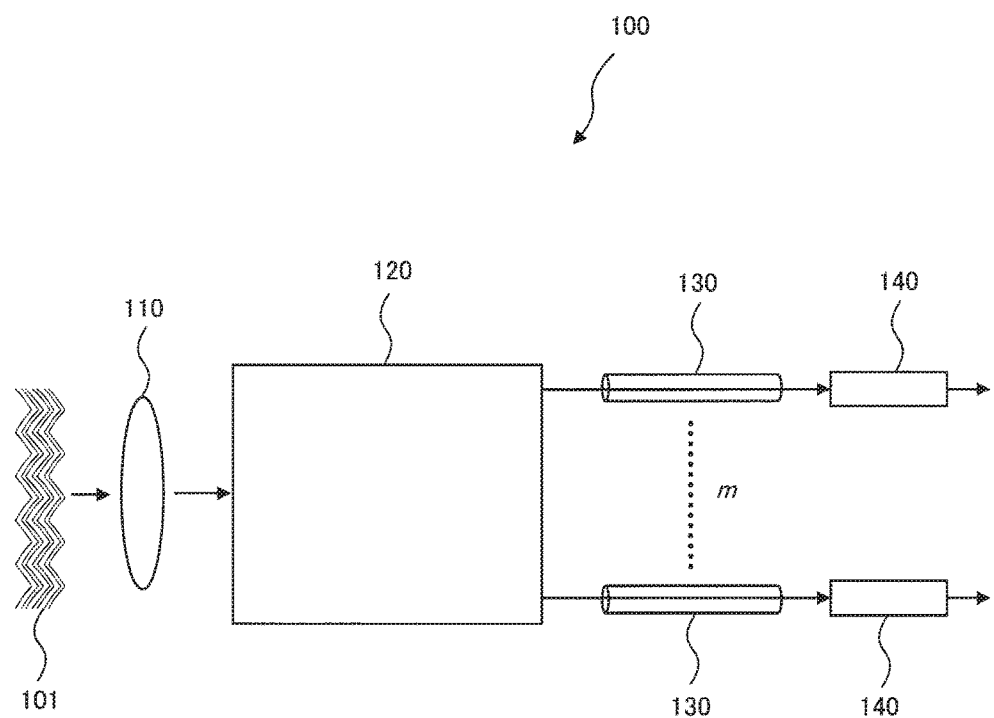
FIG. 1 is a block diagram illustrating a configuration of a free space optical receiver in accordance with a first exemplary embodiment of the present invention.

FIG. 1 is a block diagram illustrating a configuration of a free space optical receiver 100 in accordance with a first exemplary embodiment of the present invention. The free space optical receiver 100 includes light collecting means 110 for collecting laser light 101 having propagated through a free space transmission path, mode controlling means 120, a plurality of single mode transmission media 130, and a plurality of light receiving means 140.

The mode controlling means 120 separates the laser light collected by the light collecting means 110 into a plurality of propagation mode beams depending on the wave-front fluctuation of the laser light and outputs the propagation mode beams. Each of the single mode transmission media 130 guides one of the plurality of propagation mode beams. Each of the light receiving means 140 receives one of the plurality of propagation mode beams through the single mode transmission media 130. In FIG. 1, the number of the plurality of single mode transmission media 130 and the number of the plurality of light receiving means 140 are represented by "m", respectively.

As mentioned above, the fluctuation (scintillation) of the received light intensity, which becomes a problem in the free space optics (FSO), is attributed to the wave-front fluctuation of the laser light due to random atmospheric disturbance. Here, the free space optical receiver 100 of the present exemplary embodiment is configured in which the mode controlling means 120 separates the laser light collected by the light collecting means 110 into the plurality of propagation mode beams depending on the wave-front fluctuation of the laser light and outputs the propagation mode beams. That is to say, it becomes possible to control propagation modes depending on the wave-front fluctuation of the laser light fluctuating due to random disturbance.

Specifically, for example, if the wave-front fluctuation of the laser light is small, the mode controlling means 120 can be configured to separate the laser light collected by the light collecting means 110 into the plurality of propagation mode beams without change and output the propagation mode beams. If the wave-front fluctuation of the laser light is large but there is a sufficient margin of received power (a signal to noise ratio), the mode controlling means 120 can be configured to statically control the propagation modes of the collected laser light, and then, to separate the laser light into a plurality of propagation mode beams and output the propagation mode beams. If the wave-front fluctuation of the laser light is large and the margin of the received power (S/N ratio) is small, the mode controlling means 120 can be configured to dynamically control the propagation modes of the collected laser light, and then, to separate the laser light into a plurality of propagation mode beams and output the propagation mode beams.

The above-described configuration according to the free space optical receiver 100 of the present exemplary embodiment makes it possible to prevent the deterioration of the coupling efficiency between received light and a single mode fiber, and to achieve a higher transmission rate.

Next, a free space optical receiving method according to the present exemplary embodiment will be described.

In the free space optical receiving method of the present exemplary embodiment, first, laser light is collected that has propagated through a free space transmission path, and the collected laser light is separated into a plurality of propagation mode beams depending on the wave-front fluctuation of the laser light. Then the plurality of propagation mode beams are respectively introduced into a plurality of single mode transmission media. Finally, the plurality of propagation mode beams are received respectively that have propagated through the plurality of single mode transmission media.

The above-described configuration according to the free space optical receiving method of the present exemplary embodiment makes it possible to effectively reduce the deterioration of the coupling efficiency between received light and a single mode fiber, and to achieve a higher transmission rate.

A Second Exemplary Embodiment

Figure 2:
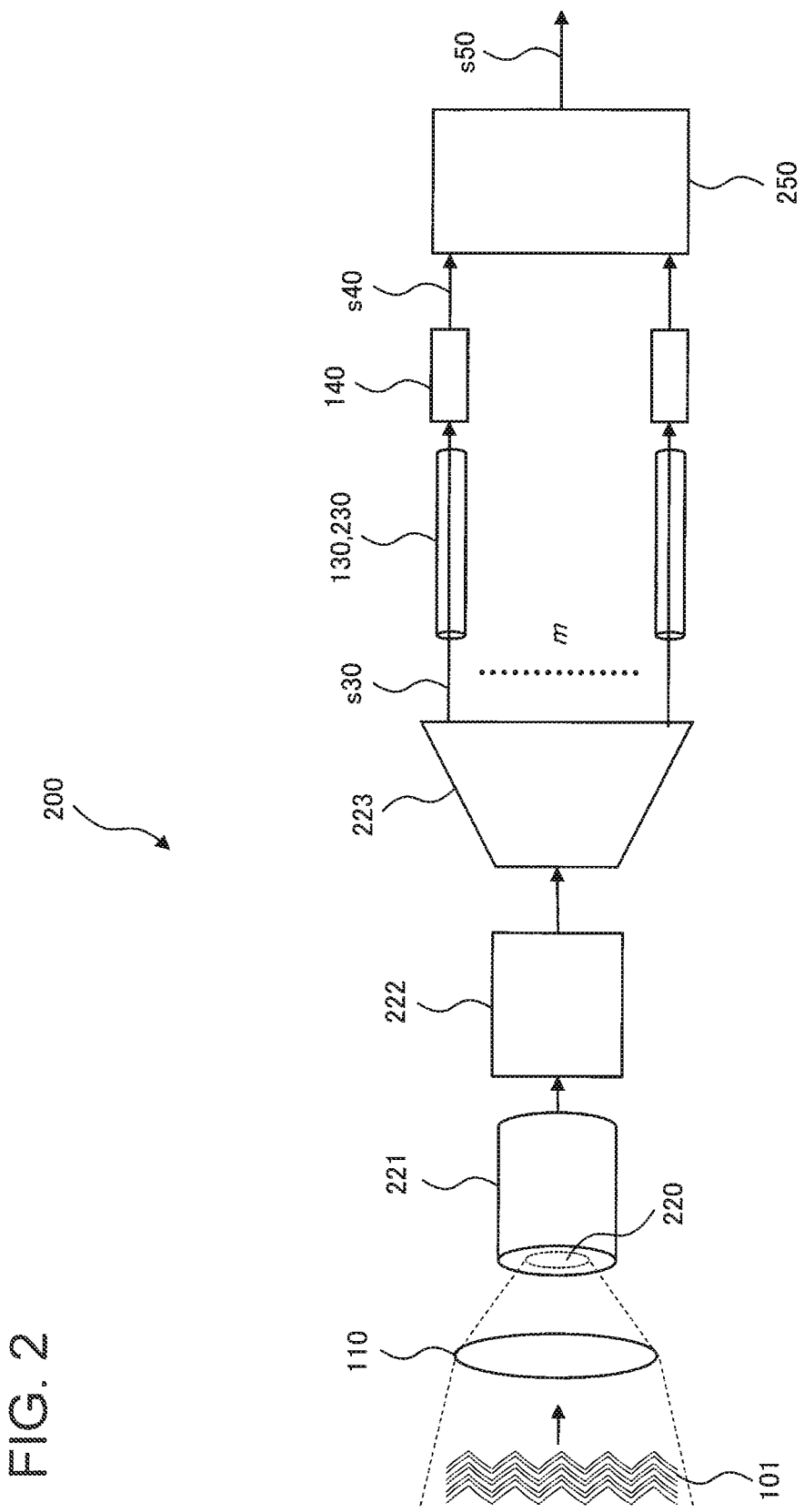
FIG. 2 is a block diagram illustrating a configuration of a free space optical receiver in accordance with a second exemplary embodiment of the present invention.

Next, a second exemplary embodiment of the present invention will be described. FIG. 2 is a block diagram illustrating a configuration of a free space optical receiver 200 in accordance with the second exemplary embodiment of the present invention.

The free space optical receiver 200 includes light collecting means 110 for collecting laser light 101 having propagated through a free space transmission path, a multimode transmission medium 221, mode converting means 222, and mode separating means 223. The multimode transmission medium 221, the mode converting means 222, and the mode separating means 223 compose mode controlling means. The mode controlling means produces multimode beams from laser light and produces a plurality of propagation mode beams obtained by converting high-order mode beams included in the multimode beams into low-order mode beams by controlling the multimode beams.

The free space optical receiver 200 further includes a plurality of single mode transmission media 130, a plurality of light receiving means 140, and signal processing means 250.

Each of the single mode transmission media 130 guides one of the plurality of propagation mode beams. As the single mode transmission media 130, a single mode fiber (SMF) 230 can be typically used.

Each of the light receiving means 140 receives one of the plurality of propagation mode beams through the plurality of single mode transmission media 130. The signal processing means 250 performs signal processing on a plurality of received signals s40 output from the plurality of light receiving means 140 and outputs an output signal s50 synthesized from the plurality of received signals s40.

Next, the operation of the free space optical receiver 200 according to the present exemplary embodiment will be described.

Signal light subjected to a wave-front fluctuation after having propagated through a free space transmission path is focused on an end face 220 of the multimode transmission medium 221 by the light collecting means 110. The collected signal light propagates through the multimode transmission medium 221 and is connected to the mode converting means 222. The signal light is subjected to a mode conversion in the mode converting means 222, and then separated into a plurality of orthogonal modes by the mode separating means 223. Then, each signal light is output to the single mode fiber 230.

A plurality of single mode beams s30 coupled to the single mode fibers 230 are received respectively in the light receiving means 140, and received signals s40 with respective modes are generated. All the received signals s40 are subjected to signal processing in the signal processing means 250, and then the received signal s50 is output.

The number of modes "m" into which the mode separating means 223 can separate the signal light in a single mode is equal to or smaller than the number of modes that the multimode transmission medium 221 can propagate.

In general, the number of propagation modes that the multimode transmission medium 221 can allow is equal to or more than 100. In contrast, the modes is limited to several tens of modes that can be separated by a mode separation technology used in an optical fiber communication technology. Accordingly, a non-separable propagation mode among the propagation modes produced by the multimode transmission medium 221 gets mixed in with a separated single mode optical signal as a crosstalk and results in signal quality deterioration, or turns to a radiation mode and causes signal unavailability.

On the other hand, since the free space optical receiver 200 of the present exemplary embodiment is configured to include the mode converting means 222, it is possible to avoid such problems. That is to say, the mode converting means 222 makes it possible to receive selectively only single mode signal light that can be coupled to the single mode fiber 230 and can be separated in the mode separating means 223 from among many propagation modes of the multimode transmission medium 221. As a result, it is possible to satisfy both of a higher bit rate of the transmission signal and highly efficient fiber coupling, and it becomes possible to achieve the high-capacity free space optics (FSO).

Next, the configuration and the operation of each means composing the free space optical receiver 200 of the present exemplary embodiment will be described in more detail.

(Light Collecting Means 110)

The light collecting means 110 is composed of an optical system including an optical antenna. The light collecting means 110 focuses the laser light 101, which has been transmitted from an opposite transmitting device and has propagated through the free space transmission path, on the end face 220 of the multimode transmission medium 221. The light collecting means 110 may be configured to include also a tracking function for the transmitting device.

(Multimode Transmission Medium 221)

The multimode transmission medium 221 receives input of the laser light 101 and outputs multimode beams. That is to say, the multimode transmission medium 221 is an optical waveguide medium through which more than one mode can propagate. Typically, a multimode optical fiber (MMF) can be used. The free space may be used as the optical waveguide medium.

The multimode optical fiber (MMF) has a wider core diameter and a larger numerical aperture (NA) compared with the single mode fiber (SMF). Accordingly, even though a speckle pattern arises on the end face 220 of the multimode transmission medium 221 due to the wave-front fluctuation of the signal light through the free space propagation, the probability of a deviation of a beam spot from the core is significantly reduced. As a result, it is possible to prevent the deterioration of the fiber coupling efficiency due to the scintillation and to maintain highly efficient fiber coupling. At this time, the signal light with distorted wave-front due to an atmospheric disturbance and the like is coupled to the multimode transmission medium 221 and then propagates in high-order modes.

The mode converting means 222 can be configured to include the multimode transmission medium 221 by giving the same incidence characteristics as those on the end face 220 of the multimode transmission medium 221 to the input part of the mode converting means 222 in a subsequent stage. The multimode transmission medium 221 in whole or part may be configured to include a gain medium such as an erbium-doped optical fiber amplifier (EDFA), for example.

(Mode Converting Means 222)

The mode converting means 222 performs the mode conversion so that the propagation mode of the incident signal light may turn into a different propagation mode. Specifically, the mode converting means 222 controls multimode beams and produces a plurality of propagation mode beams that are obtained by converting high-order mode beams included in the multimode beams into low-order mode beams. The control of the multimode beams at this time can be performed statically or dynamically.

Figure 3A:
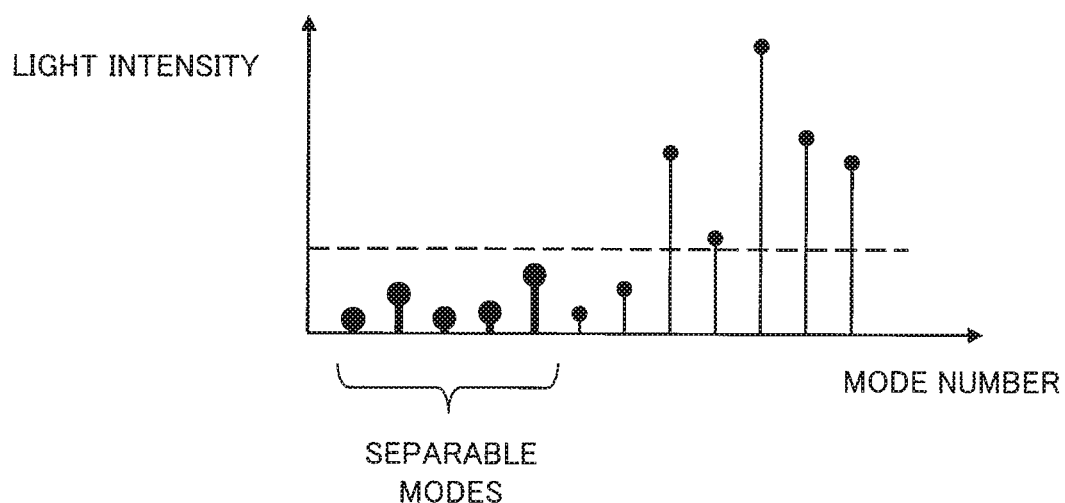
FIG. 3A is a schematic view illustrating light intensity distribution of each propagation mode of signal light inputted into mode converting means included in a free space optical receiver in accordance with the second exemplary embodiment of the present invention.
Figure 3B:
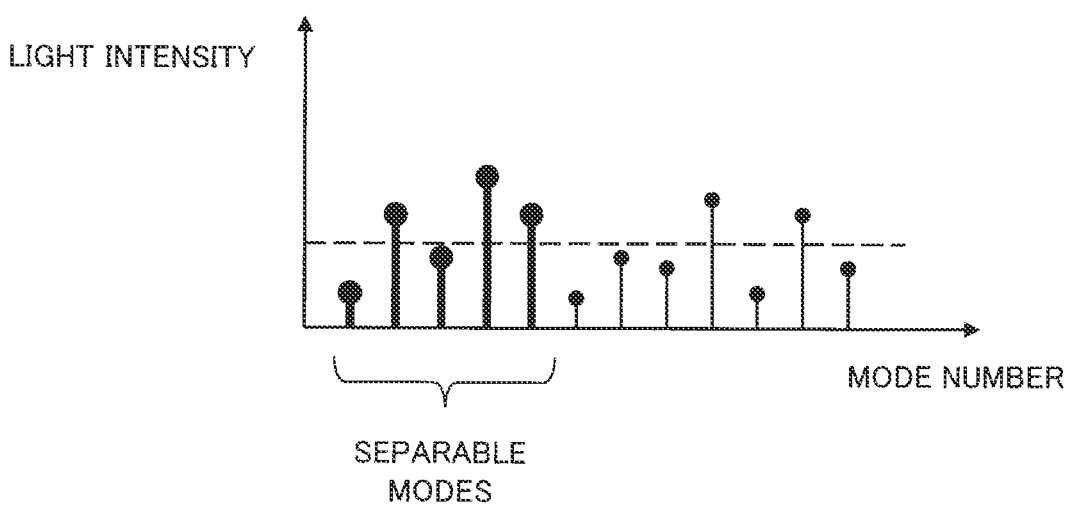
FIG. 3B is a schematic view illustrating light intensity distribution of each propagation mode of signal light outputted from the mode converting means included in a free space optical receiver in accordance with the second exemplary embodiment of the present invention.

The operation of the mode converting means 222 will be described using FIG. 3A and FIG. 3B. FIG. 3A and FIG. 3B are schematic views schematically illustrating light intensity distributions of the signal light having propagated through the multimode transmission medium 221 for each instantaneous propagation mode. FIG. 3A illustrates the light intensity distribution of each propagation mode of the signal light inputted into the mode converting means 222, and FIG. 3B illustrates the light intensity distribution of each propagation mode of the signal light outputted passing through the mode converting means 222.

In FIG. 3A and FIG. 3B, the horizontal axis represents a notional mode number indicating the state of excitation modes in the multimode transmission medium 221. Specifically, for example, it is possible to use the order of Zernike polynomial, the order of a LP mode (linearly polarized mode), and the like. In FIG. 3A and FIG. 3B, the vertical axis represents the light intensity of the signal light for each mode. It is assumed in FIG. 3A and FIG. 3B that the mode separating means 223 in the subsequent stage can separate only five modes from low-order side. The broken lines in FIG. 3A and FIG. 3B represent minimum light intensity with which the light receiving means 140 can receive the signal light.

FIG. 3A illustrates the light intensity distribution of each propagation mode of the signal light inputted into the mode converting means 222. As illustrated in FIG. 3A, the energy of the optical signal is concentrated in high-order modes due to the distorted wave-front through the free space propagation. Consequently, even if the signal light having such mode distribution is inputted into the mode separating means 223 without change and then subjected to a mode separation, it is impossible to obtain sufficient light intensity by single mode signal light that can be coupled to the single mode fiber 230. The high-order mode signal light, to which greater part of the light intensity is distributed, turns to a radiation mode in the mode separating means 223 and causes a data gap after being received in the light receiving means 140.

FIG. 3B illustrates the light intensity distribution of each propagation mode of the signal light that has the mode distribution illustrated in FIG. 3A and is output passing through the mode converting means 222. As can be seen in FIG. 3B, the energy of the signal light is made to change from high-order modes to low order modes, and then the signal light is output. It can be found that the energy above the receivable level of the light receiving means 140 is distributed to the signal light with the low-order modes although the energy still remains of the signal light with the high-order modes.

As described above, the mode converting means 222 performs the mode conversion so that the mode distribution illustrated in FIG. 3A may turn to the mode distribution illustrated in FIG. 3B. This enables the mode separating means 223 to perform the mode separation to separate the signal light into the mode that can be coupled to the single mode fiber 230. As a result, according to the free space optical receiver 200 of the present exemplary embodiment, even though the scintillation arises, it is possible to avoid a gap in signals, achieve a high efficient coupling between the received light and the single mode fiber, and achieve a higher transmission rate.

The mode converting means 222 can be configured by a free space light modulator, for example. Specifically, it is possible to use a free space light modulator using the acousto-optical effect, Faraday rotation of the magneto-optical effect, the electro-optical effect, and the like. It may be applied to combine optical transmission media that are capable of a mode coupling and that include optical media to which a stress is applied such as a coiled fiber. If the coiled fiber is used, it is possible to couple low-order mode beams with high-order mode beams, and separate part of the energy of the high-order mode beams into the low-order mode beams; therefore, the multi-mode beams can be controlled statically.

(Mode Separating Means 223)

The mode separating means 223 separates respective orthogonal propagation modes from the incident multimode signal light, and performs a mode conversion so that each optical signal can be coupled to the single mode fiber 230. The mode separating means 223 can be configured to include a mode filter.

As mentioned above, the number of modes that the multimode transmission medium can propagate is generally larger than the number of modes into which the mode separating means 223 can separate the signal light. Accordingly, it is difficult to separate and receive all modes that propagate through the multimode transmission medium. Because the fluctuation that the signal light is subjected to during propagating through the space is random, it is not always true that the configuration including only the multimode transmission medium 221 and the mode separating means 223 excites a mode that can be coupled to a single mode fiber. The free space optical receiver 200 of the present exemplary embodiment, however, is configured to include the mode converting means 222 between the multimode transmission medium 221 and the mode separating means 223. This makes it possible to obtain a mode that can be coupled to a single mode fiber even though the scintillation arises. The received signal is coupled to the single mode fiber 230 through the mode separating means 223, which enables to utilize the coherent receiving technology using the single mode fiber. As a result, it is possible to achieve a high bit rate and highly sensitive reception.

The mode separating means 223 can be configured by combining a phase plate and a single mode fiber (SMF), or combining a photonic lantern (PL) element and a signal processing circuit, or the like, for example.

(Light Receiving Means 140)

The light receiving means 140 includes an optical receiving means with a high bit rate that receives input from a single mode fiber (SMF), and performs a photoelectric conversion on the received signal light. Particularly, a coherent receiver using a digital coherent technology may be employed that can receive signals with high sensitivity at a high transmission rate. In the present exemplary embodiment, the number of modes coupled to the single mode fibers 230 by the mode separating means 223 is set at "m", and the light receiving means 140 whose number of pieces corresponds to "m" are connected to the single mode fibers 230.

(Signal Processing Means 250)

The signal processing means 250 performs a synthesizing process for received signals after space propagation from the received signals s40 of respective m-pieces modes that are received in the light receiving means 140.

The mode of the signal light propagating through the multimode transmission medium 221 temporally fluctuates due to the scintillation. Depending on the mode fluctuation, the intensity of each single mode beam inputted into the plurality of light receiving means 140 also fluctuates; therefore, the quality of the output received signals s40 also fluctuates. The signal processing means 250 compensates for the intensity fluctuation between the modes and reproduces the signals transmitted by the transmitting device.

The signal processing means 250 may be configured to compensate for a skew arising between m-pieces received signals in addition to the above process. The skew includes a skew due to the mode dispersion of the multimode transmission medium 221 and a skew due to fiber length following the mode separating means 223 or wiring length, and the like. The signal processing means 250 can also be configured to compensate for a mode mix or a mode crosstalk in the mode separating means 223 in addition to the above process.

The signal processing means 250 can be configured by applying an A/D (analog-to-digital) converter and a digital signal processing technology.

By means of the above-mentioned configuration, according to the free space optical receiver 200 of the present exemplary embodiment, it is possible to prevent the deterioration of the coupling efficiency between received light and a single mode fiber, and to achieve a higher transmission rate.

Next, a free space optical receiving method according to the present exemplary embodiment will be described.

In the free space optical receiving method of the present exemplary embodiment, first, laser light is collected that has propagated through a free space transmission path, and the collected laser light is separated into a plurality of propagation mode beams depending on the wave-front fluctuation of the laser light. Then the plurality of propagation mode beams are respectively introduced into a plurality of single mode transmission media. Finally, the plurality of propagation mode beams are respectively received that have propagated through the plurality of single mode transmission media.

Here, the following processing is performed in separating the laser light into the plurality of propagation mode beams mentioned above. First, the laser light is introduced into a multimode transmission medium, and multimode beams are produced. By controlling the multimode beams, a plurality of propagation mode beams are produced that are obtained by converting high-order mode beams included in the multimode beams into low-order mode beams. Then a process is performed in which the plurality of propagation mode beams are separated respectively.

The above-described configuration according to the free space optical receiving method of the present exemplary embodiment makes it possible to prevent the deterioration of the coupling efficiency between received light and a single mode fiber, and to achieve a higher transmission rate.

A Third Exemplary Embodiment

Figure 4:
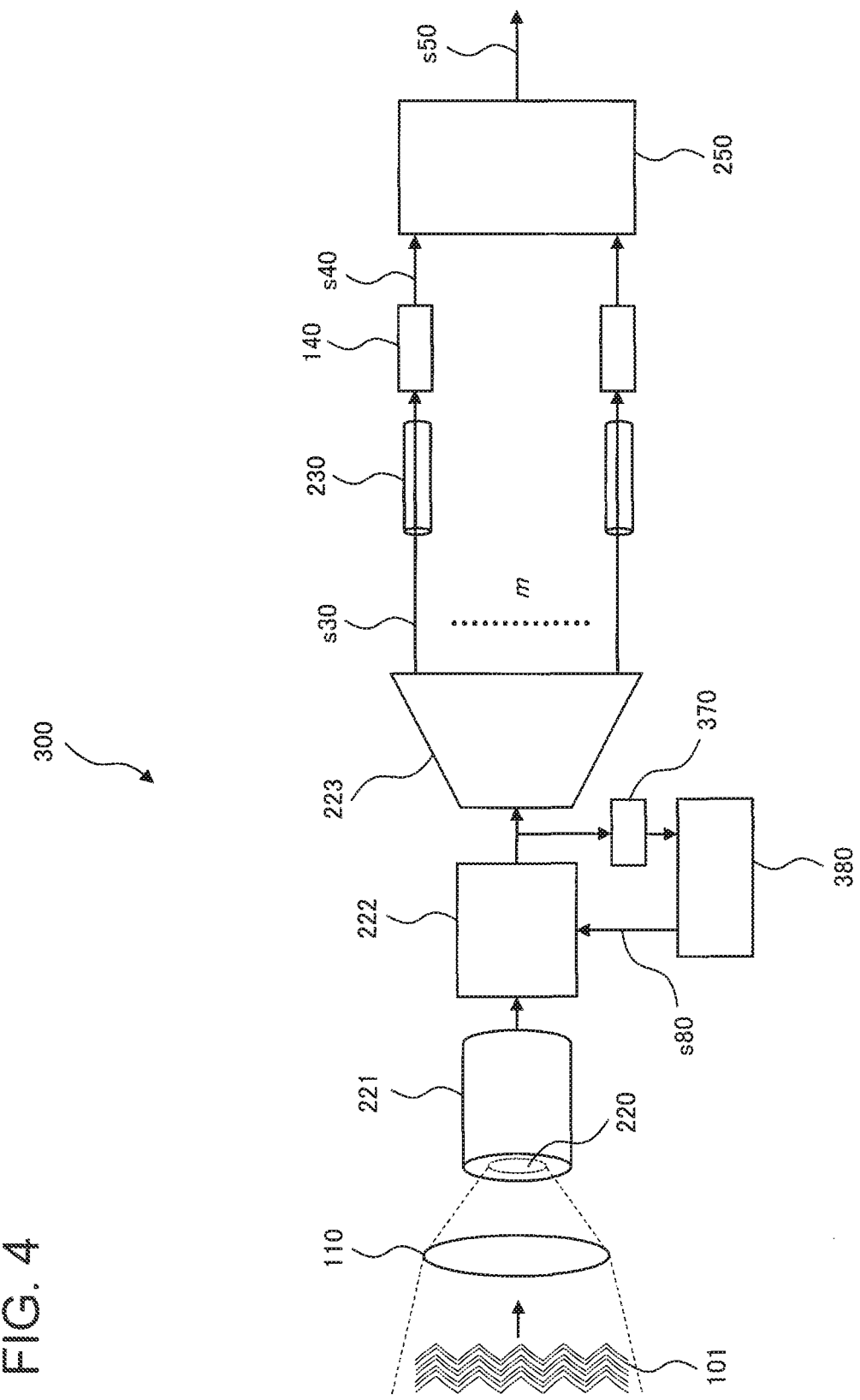
FIG. 4 is a block diagram illustrating a configuration of a free space optical receiver in accordance with a third exemplary embodiment of the present invention.

Next, a third exemplary embodiment of the present invention will be described. FIG. 4 is a block diagram illustrating a configuration of a free space optical receiver 300 in accordance with the present exemplary embodiment.

The free space optical receiver 300 includes light collecting means 110, a multimode transmission medium 221, mode converting means 222, mode separating means 223, single mode fibers 230 as a plurality of single mode transmission media, a plurality of light receiving means 140, and signal processing means 250. The above-described configurations are similar to those of the free space optical receiver 200 according to the second exemplary embodiment.

The free space optical receiver 300 according to the present exemplary embodiment differs from the free space optical receiver 200 according to the second exemplary embodiment in controlling a mode converting function dynamically in combination with monitoring means. That is to say, the free space optical receiver 300 of the present exemplary embodiment includes monitoring means 370 for monitoring the light intensity of a plurality of propagation mode beams output from the mode converting means 222, and controlling means 380 for controlling the operation of the mode converting means 222 dynamically based on monitoring results of the monitoring means 370.

The monitoring means 370 monitors the intensity of the signal light inputted into the mode separating means 223. Based on an intensity signal monitored at this time, the controlling means 380 controls the mode converting means 222 according to a predetermined procedure so that the output light intensity of the mode separating means 223 may be maximized. This makes it possible to minimize gaps of the output signal s50 due to the scintillation.

According to the free space optical receiver 300 of the present exemplary embodiment, the above-described configuration makes it possible to mitigate the impacts caused by the scintillation of received signals in the free space optics (FSO). As a result, it is possible to satisfy both of a higher transmission rate and highly efficient fiber coupling, and it becomes possible to achieve the high-capacity free space optics (FSO).

Next, the configuration and the operation of each means composing the free space optical receiver 300 of the present exemplary embodiment will be described in more detail.

(Mode Converting Means 222)

The mode converting means 222 receives a control signal s80 from the controlling means 380, converts the propagation mode of the input optical signal into a different propagation mode according to the state of the control signal s80, and outputs the resultant signal. The mode conversion can include a continuous intensity variation of each mode according to the value of the inputted control signal s80.

(Monitoring Means 370)

In the present exemplary embodiment, as illustrated in FIG. 4, the monitoring means 370 receives input of a part of and branching off from the output signal of the mode converting means 222. The monitoring means 370 is configured to collectively detect the light intensities of the optical signals propagating through a multi mode optical fiber (MMF) after the mode conversion. It is assumed that the propagation mode in the output of the mode converting means 222 matches with the mode that the mode separating means 223 can separate. At this time, the detected intensity of the monitoring means 370 indicates the sum of the light intensities after the mode separation.

The monitoring means 370 may perform a mode separation by a method similar to that of the mode separating means 223 and monitor the light intensity of each mode. At this time, it is not necessarily required that the number of modes to be separated is equal to the number of modes in the mode separating means 223. In addition, the monitoring means 370 may be configured to detect the wave-front information and the light intensity distribution using a wave-front sensor and the like and analyze the light intensity distribution of each mode.

(Controlling Means 380)

The controlling means 380 controls the mode converting operation of the mode converting means 222 through the control signal s80 so that the detected intensity of the monitoring means 370 may be maximized.

Figure 5:
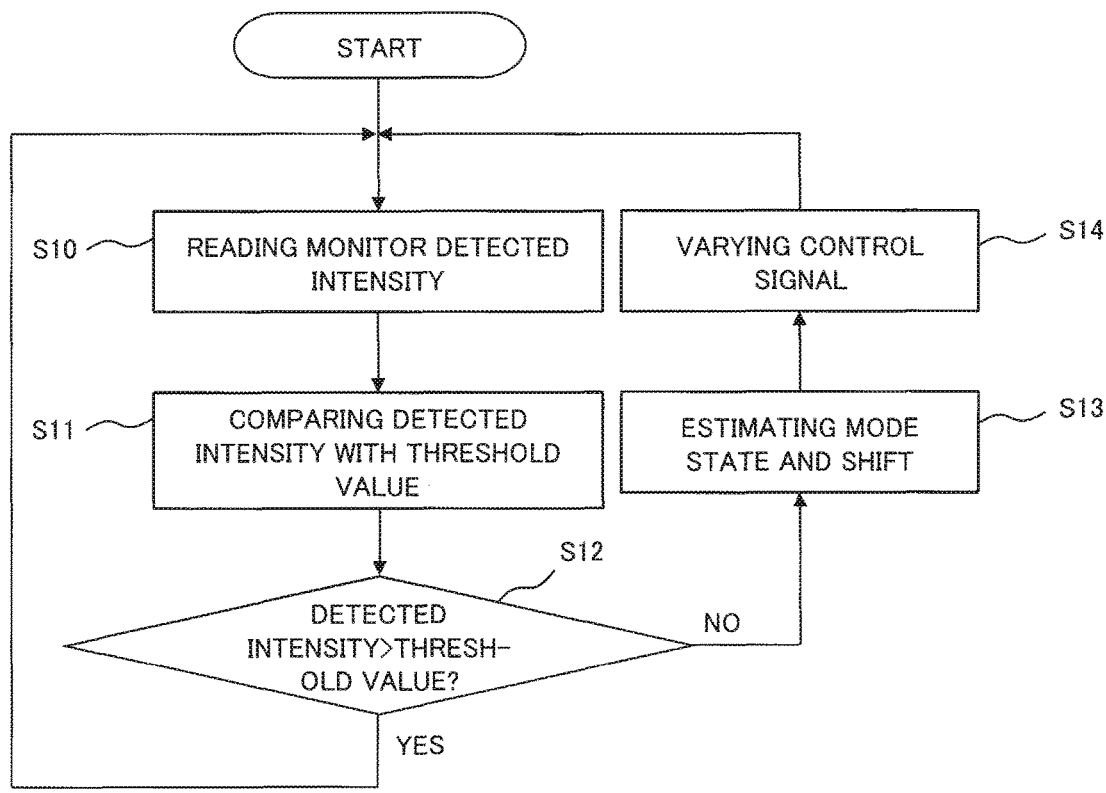
FIG. 5 is a flowchart to explain the operation of controlling means included in the free space optical receiver in accordance with the third exemplary embodiment of the present invention.

The operation of the controlling means 380 will be described using FIG. 5. FIG. 5 is a flowchart to explain an example of the operation of the controlling means 380.

First, the controlling means 380 reads light intensity information detected by the monitoring means 370 (step S10). Then the detected light intensity is compared with a predetermined threshold value (step S11), and it is determined whether the light intensity is sufficient (step S12). If the detected intensity is above the threshold value (step S12/YES), it is determined that adequate optical signal is inputted into the light receiving means 140. That is to say, this condition corresponds to the condition illustrated in FIG. 3B; accordingly, the controlling means 380 maintains the condition and returns to step S10 in order to read the detected intensity of the monitoring means 370 again.

If the detected intensity is below the threshold value (step S12/NO), it is estimated that the light receiving means 140 does not receive the optical signal with adequate intensity. That is to say, this case can be estimated to be a condition corresponding to that illustrated in FIG. 3A. At this time, the controlling means 380 estimates the state of the propagation mode and the direction of a shift in the mode converting means 222 (step S13), and varies the value of the control signal s80 according to the estimation (step S14). After varying the value of the control signal s80, the controlling means 380 returns to step S10 in order to read the detected intensity of the monitoring means 370 again.

The controlling means 380 repeats a sequence of operations described above, so that the propagation modes of the signal light inputted into the mode separating means 223 are converted into the condition illustrated in FIG. 3B; therefore, stable reception is maintained. In order to estimate the direction of a shift in mode states, commonly known technologies can be used such as a technology of superposing a dither signal on the input signal or the control signal s80 and performing lock-in detection, for example.

By means of the above-mentioned configuration, according to the free space optical receiver 300 of the present exemplary embodiment, it is possible to prevent the deterioration of the coupling efficiency between received light and a single mode fiber, and to achieve a higher transmission rate. That is to say, even though a coupling condition with a fiber varies dynamically by the scintillation due to a dynamic fluctuation of environments of the free space through which optical signals propagate, it is possible to follow the variation in mode states of the received optical signals. As a result, stable reception in the free space optics (FSO) becomes possible.

A Fourth Exemplary Embodiment

Figure 6:
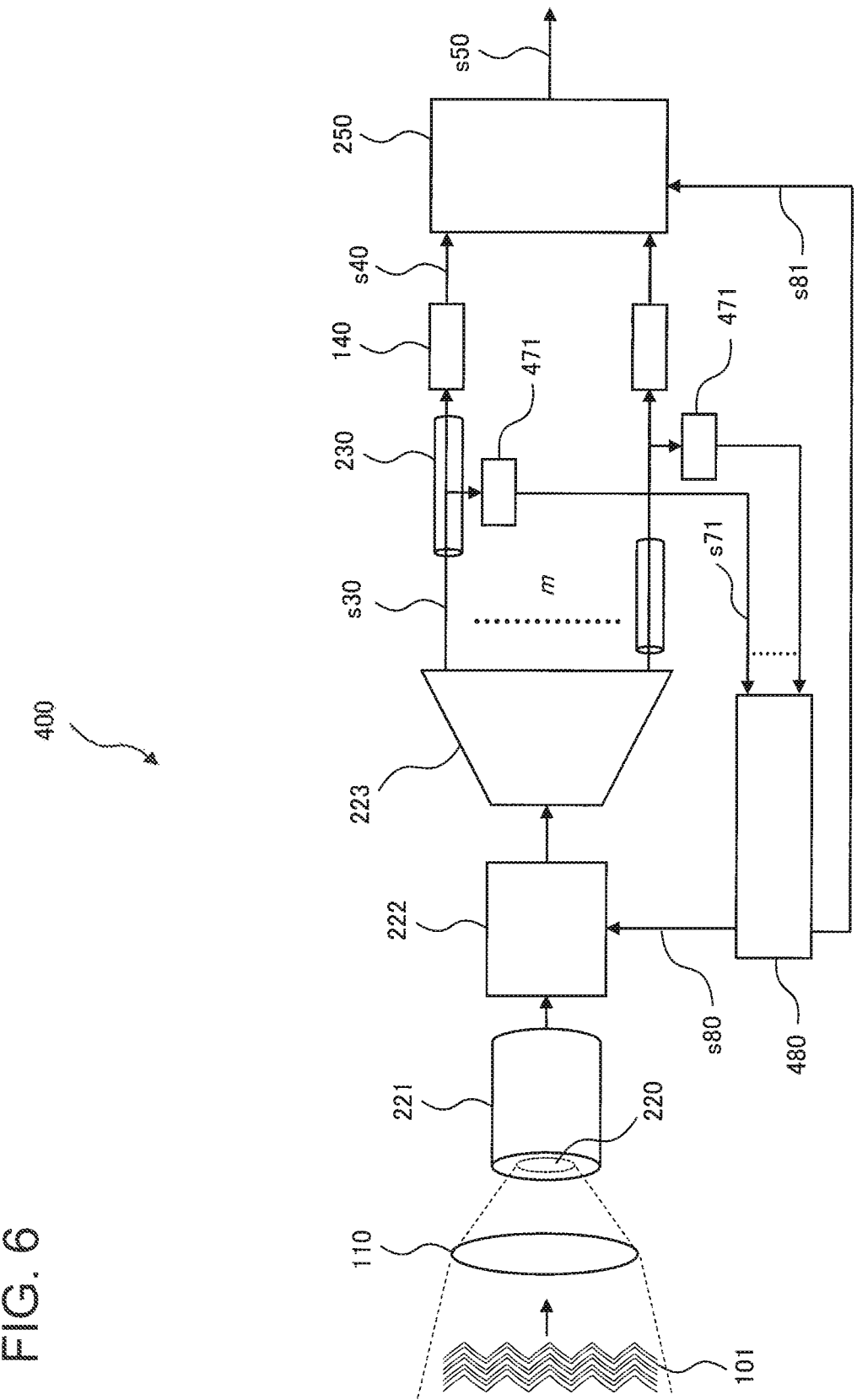
FIG. 6 is a block diagram illustrating a configuration of a free space optical receiver in accordance with a fourth exemplary embodiment of the present invention.

Next, a fourth exemplary embodiment of the present invention will be described. FIG. 6 is a block diagram illustrating a configuration of a free space optical receiver 400 in accordance with the present exemplary embodiment. The free space optical receiver 400 in accordance with the present exemplary embodiment differs from the free space optical receiver 300 according to the third exemplary embodiment in the configuration of monitoring means and controlling means. The other configurations are similar to those of the free space optical receiver 300 according to the third exemplary embodiment; accordingly, a detailed description of them is omitted.

The free space optical receiver 400 includes monitoring means 471 for monitoring each light intensity of a plurality of propagation mode beams output from the mode separating means 223, and controlling means 480 for controlling the operation of the mode converting means 222 based on monitoring results of the monitoring means 471.

The monitoring means 471 monitors the light intensity of a single mode beam s30 propagating through each of single mode fibers 230 as the plurality of single mode transmission media after the mode separation by the mode separating means 223. That is to say, the present exemplary embodiment is characterized by the configuration in which the monitoring means 471 monitors the information uniquely corresponding to the intensity of optical signal with single mode (S30). The monitoring means 471 can monitor a part of the single mode optical signal (S30) branching off from the single mode fiber 230, using optical splitting means, for example. A light intensity monitoring function embedded in the light receiving means 140 may be used. Further, the monitoring means 471 may be configured to monitor the amplitude of the photoelectric-converted received signal s40 or to detect the signal intensity in the signal processing means 250.

In the free space optical receiver 400, m-lines of detected intensity signals s71 are inputted into the controlling means 480 from the monitoring means 471 whose number of pieces is equal to the number "m" of separated modes. Based on the m-lines of detected intensity signals s71, the controlling means 480 generates a control signal s80 according to a predetermined procedure and controls the mode converting operation of the mode converting means 222. As the predetermined procedure, the controlling means 480 operates so as to maximize the intensity of any one of the single mode beams s30 after mode separation and to maintain an optical level sufficient for receiving the single mode beams by the light receiving means 140, for example. Without being limited to this, by maximizing the sum of a plurality of intensities of the single mode beams s30 after mode separation, the controlling means 480 may operate so as to maintain an optical level sufficient for receiving the single mode beams by the light receiving means 140.

The signal processing means 250 may be configured to obtain the monitoring results of the monitoring means 471 from the controlling means 480 and perform signal processing based on the monitoring results. Specifically, the controlling means 480 notifies the signal processing means 250 of a mode control state signal s81 and optimizes the signal processing. At this time, the signal processing means 250 sequentially obtains the information on the states, the intensity distribution and the like of the received signals after mode separation by the mode control state signal s81. This enables the signal processing means 250 to estimate the quality of the received signals by a predetermined method. As a result, the signal processing means 250 performs the signal processing based on the received signals of one or a plurality of modes according to a predetermined algorithm, by which the signal processing means 250 can optimize the quality of the output signal s50.

As mentioned above, the free space optical receiver 400 is configured to monitor individually the signal intensity of each mode coupled to the single mode fiber 230 after mode separation. This makes it possible to monitor the mode distribution accurately, so that it is possible to enhance the accuracy of the mode conversion. As a result, it is possible to prevent more adequately the deterioration of the coupling efficiency between received light and a single mode fiber, and to achieve a higher transmission rate.

It is possible to enhance the accuracy in optimizing the signal processing for the modes correlating with each other by notifying dynamically the signal processing means 250 of the information on the state and the variation of the modes. As a result, it becomes possible to improve the quality of the output signal s50.

A Fifth Exemplary Embodiment

Figure 7:
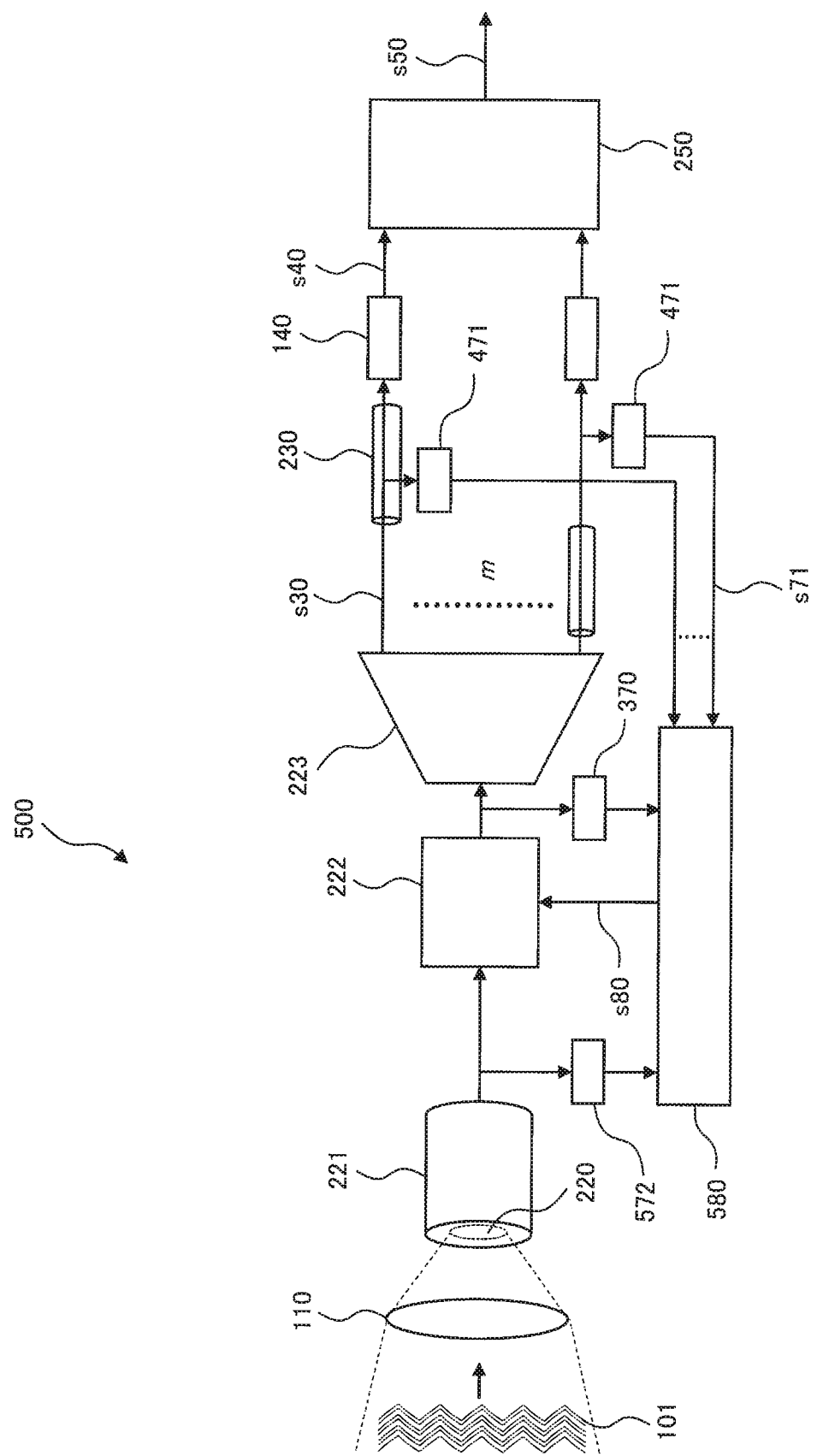
FIG. 7 is a block diagram illustrating a configuration of a free space optical receiver in accordance with a fifth exemplary embodiment of the present invention.

Next, a fifth exemplary embodiment of the present invention will be described. FIG. 7 is a block diagram illustrating a configuration of a free space optical receiver 500 in accordance with the present exemplary embodiment. The free space optical receiver 500 according to the present exemplary embodiment differs from the free space optical receiver 300 according to the third exemplary embodiment in the configurations of monitoring means and controlling means. The other configurations are similar to those of the free space optical receiver 300 according to the third exemplary embodiment; accordingly, a detailed description of them is omitted.

The free space optical receiver 500 according to the present exemplary embodiment includes monitoring means 572 for monitoring the state of propagation modes of the laser light inputted into the mode converting means 222, and controlling means 580 for controlling the operation of the mode converting means 222 based on the monitoring results of the monitoring means 572. In the present exemplary embodiment, as illustrated in FIG. 7, the free space optical receiver 500 is configured to include also the monitoring means 370 according to the third exemplary embodiment and the monitoring means 471 according to the fourth exemplary embodiment, together with the monitoring means 572. The controlling means 580 generates a control signal s80 according to a predetermined procedure based on some or all of the detected intensity signals output from these monitoring means. By which, the controlling means 580 controls the mode converting operation of the mode converting means 222.

The monitoring means 572 of the present exemplary embodiment monitors the state of the propagation modes of the laser light (signal light) inputted into the mode converting means 222. As the monitoring means 572, a wave-front sensor and the like can be used, for example.

According to the free space optical receiver 500 of the present exemplary embodiment, it becomes possible to enhance the accuracy of the mode estimation in the controlling means 580 by monitoring the mode state of the signal light inputted into the mode converting means 222. As a result, it is possible to prevent more adequately the deterioration of the coupling efficiency between received light and a single mode fiber, and to achieve a higher transmission rate.

A Sixth Exemplary Embodiment

Figure 8:
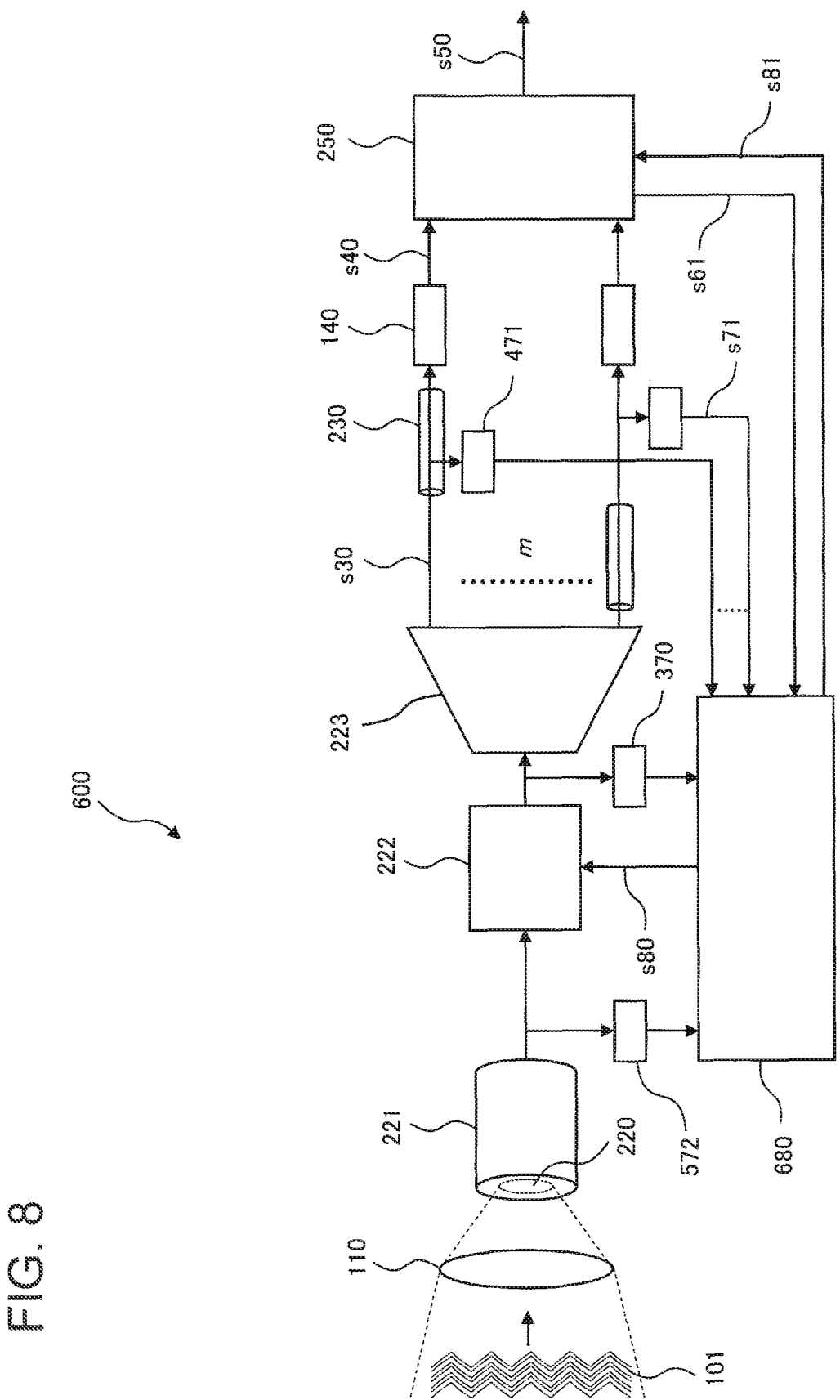
FIG. 8 is a block diagram illustrating a configuration of a free space optical receiver in accordance with a sixth exemplary embodiment of the present invention.

Next, a sixth exemplary embodiment of the present invention will be described. FIG. 8 is a block diagram illustrating a configuration of a free space optical receiver 600 in accordance with the present exemplary embodiment. The free space optical receiver 600 according to the present exemplary embodiment differs from the free space optical receiver 500 according to the fifth exemplary embodiment in the operations of the signal processing means 250 and controlling means 680. The other configurations are similar to those of the free space optical receiver 500 according to the fifth exemplary embodiment; accordingly, a detailed description of them is omitted.

In the free space optical receiver 600 according to the present exemplary embodiment, the signal processing means 250 notifies the controlling means 680 of received signal information s61 of the information obtained from the received signals. The controlling means 680 controls the operation of the mode converting means 222 based on the received signal information s61.

The controlling means 680 generates the control signal s80 based on some or all of the detected intensity signals output from the monitoring means 370, the monitoring means 471, and the monitoring means 572. This makes it possible to enhance the accuracy of the mode estimation in the controlling means 680. Further, the controlling means 680 generates the control signal s80 based on received signal information s61, that is, any or all of the intensity, the S/N (Signal/Noise) ratio, the error rate information of each mode signal detected by the signal processing means 250.

The above-described configuration, according to the free space optical receiver 600 of the present exemplary embodiment, makes it possible to perform a control for minimizing the error rate of the output signal s50 by controlling the mode converting operation of the mode converting means 222.

A Seventh Exemplary Embodiment

Figure 9:
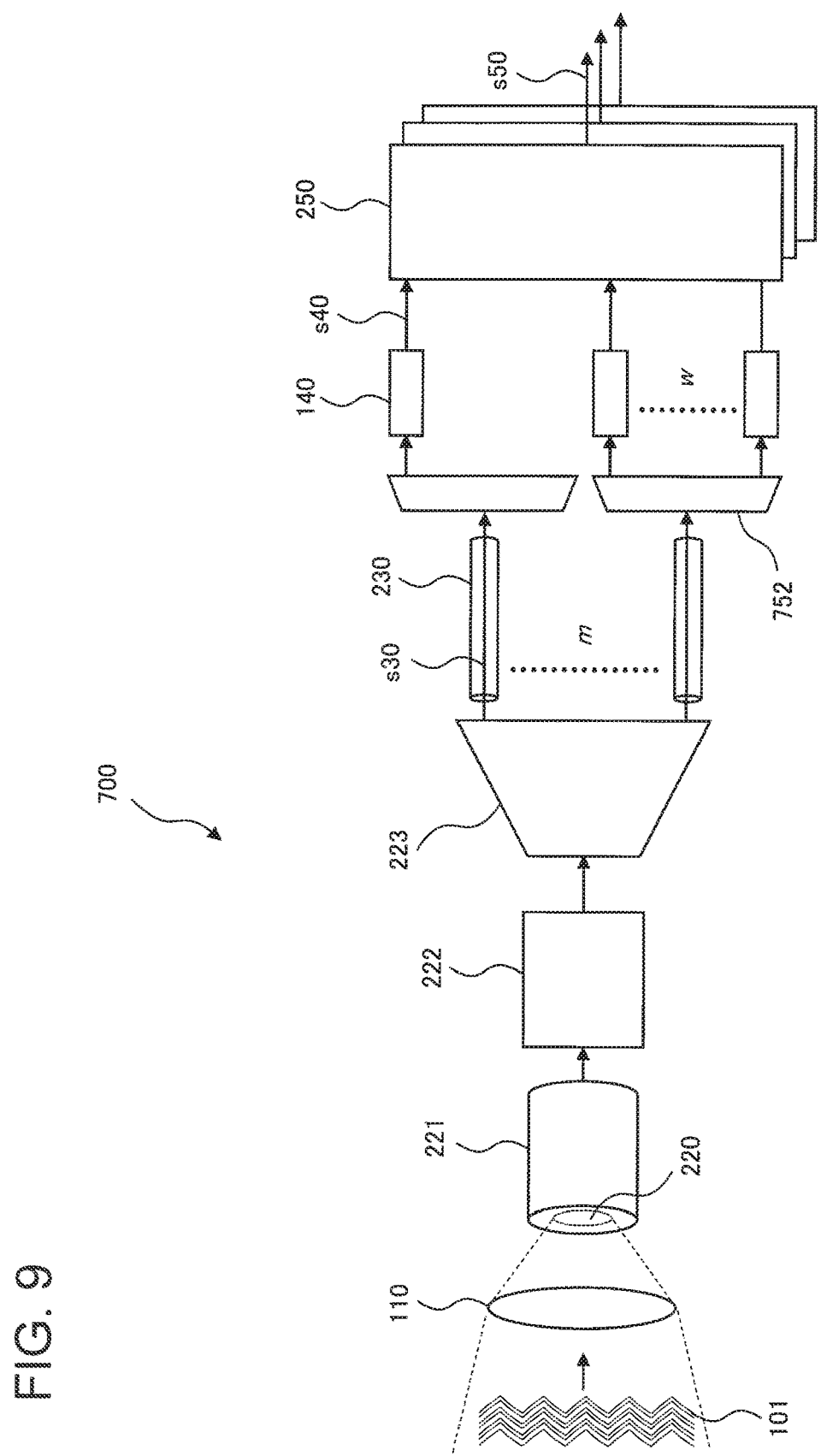
FIG. 9 is a block diagram illustrating a configuration of a free space optical receiver in accordance with a seventh exemplary embodiment of the present invention.

Next, a seventh exemplary embodiment of the present invention will be described. FIG. 9 is a block diagram illustrating a configuration of a free space optical receiver 700 according to the present exemplary embodiment.

The free space optical receiver 700 according to the present exemplary embodiment has a configuration used for wavelength multiplexing communication. That is to say, the free space optical receiver 700 receives laser light 101 of wavelength multiplexing signal light obtained by multiplexing a plurality of signal light beams each of which has a different wavelength from each other, and include wavelength demultiplexing means 752. The wavelength demultiplexing means 752 demultiplexes propagation mode beams that have been guided through the single mode fibers 230 as the single mode transmission media for each of a plurality of wavelengths that differ from each other, and outputs the resultant mode beams to the light receiving means 140. The other configurations are similar to those of the free space optical receiver 200 according to the second exemplary embodiment; accordingly, a detailed description of them is omitted.

The above-described configuration, according to the free space optical receiver 700 of the present exemplary embodiment, makes it possible to expand the transmission of the free space optics (FSO) up to a capacity multiplied by the number of multiplexed wavelengths (w).

Next, the configurations and the operations of each means composing the free space optical receiver 700 of the present exemplary embodiment will be described in more detail.

(Wavelength Demultiplexing Means 752)

As illustrated in FIG. 9, the wavelength demultiplexing means 752 are connected to m-lines of single mode fibers 230 and separate each signal light into w-pieces wavelengths. W-pieces of the light receiving means 140 are connected to the wavelength demultiplexing means 752, respectively. Consequently, the total number of the light receiving means 140 becomes equal to a product of the number of modes m to be separated and becomes m×w pieces at a maximum. Using a single mode fiber (SMF) transmission technology enables the crosstalk between wavelengths at the output side of the wavelength demultiplexing means 752 to decrease negligibly.

(Signal Processing Means 250)

The maximum number of the signal processing means 250 is w-pieces and is equal to the number of the wavelengths. In this case, it can be configured as follows to connect m×w-pieces light receiving means 140 to w-pieces signal processing means 250. That is to say, m-lines of received signals s40 output from m-pieces light receiving means 140 corresponding to each wavelength separated by the wavelength demultiplexing means 752 are connected to the identical signal processing means 250. In this configuration, the output signal s50 corresponds to each wavelength.

In the free space optical receiver 700 according to the present exemplary embodiment, the wavelength demultiplexing means 752 separates the received signals including wavelength multiplexed signals after the space transmission into each wavelength. This makes the received signals not correlate between the wavelengths; therefore, the influence of the scintillation can be limited to inter-mode correlation only. As a result, it is not necessary to perform the signal processing correlating between different wavelengths.

The configuration illustrated in FIG. 9, in which the signal processing means 250 is individually connected for each wavelength, makes it possible to reduce the circuit size of the signal processing means 250 compared with the configuration to perform a signal processing collectively on m×w-pieces received signals. In addition, even though the number of wavelengths to be multiplexed increases, it becomes possible to add or reduce facilities flexibly depending on a decrease or increase in the number of wavelengths because the configuration can be expanded gradually.

An Eighth Exemplary Embodiment

Figure 10:
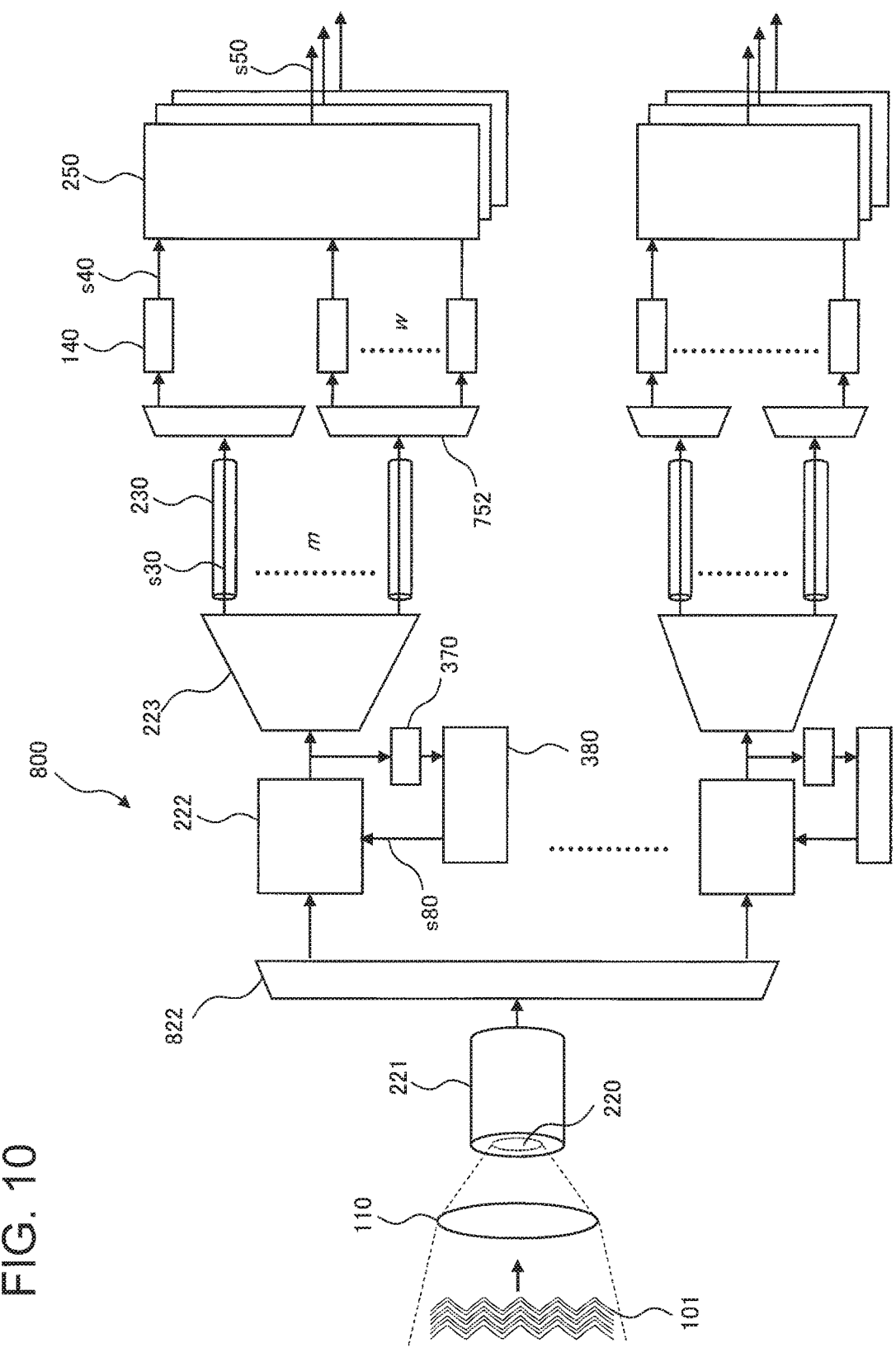
FIG. 10 is a block diagram illustrating a configuration of a free space optical receiver in accordance with an eighth exemplary embodiment of the present invention.

Next, an eighth exemplary embodiment of the present invention will be described. FIG. 10 is a block diagram illustrating a configuration of a free space optical receiver 800 according to the present exemplary embodiment.

The free space optical receiver 800 according to the present exemplary embodiment differs from the free space optical receiver 700 according to the seventh exemplary embodiment in including wavelength group generating means 822 to separate the laser light 101 into a plurality of wavelength groups including a plurality of wavelengths. The mode controlling means, which includes the multimode transmission medium 221, the mode converting means 222, and the mode separating means 223, controls a propagation mode for each wavelength group, separates the laser light into a plurality of propagation mode beams, and outputs the propagation mode beams. The other configurations are similar to those of the free space optical receiver 700 according to the seventh exemplary embodiment; accordingly, a detailed description of them is omitted.

Next, the configurations and the operations of the free space optical receiver 800 according to the present exemplary embodiment will be described in more detail.

In the free space optical receiver 800 according to the present exemplary embodiment, the wavelength group generating means 822 separates the received light to be inputted into the mode converting means 222 into wavelength groups. The wavelength group generating means 822 has wavelength separation characteristics, and has propagation characteristics that are equal to those of the mode transmission means 221 or can be regarded as homogeneous with respect to propagation modes which can be inputted into the mode converting means 222.

A plurality of mode converting means 222 are connected to the output side of the wavelength group generating means 822. In the free space optical receiver 800, the stages following the mode converting means 222 are configured to be independent of each other for each wavelength group. FIG. 10 illustrates the configuration having the wavelength demultiplexing means 752 included in the free space optical receiver 700 illustrated in FIG. 9 and the monitoring means 370 included in the free space optical receiver 300 illustrated in FIG. 4; however, the present exemplary embodiment is not limited to this.

The free space optical receiver 800 of the present exemplary embodiment separates the laser light into wavelength groups, and each of the wavelength groups includes a plurality of wavelengths falling within a wavelength range in which the wavelength dependence can be negligible. This makes it possible to perform the receiving process even though each configuration means has the wavelength dependence. For example, it becomes possible to perform the receiving process even though there is large wavelength dependence in the propagation characteristics of any one of the multimode transmission medium 221, the mode converting means 222, the mode separating means 223, and the wavelength demultiplexing means 752.

If each of the above-mentioned configuration means has wavelength dependence, the control of the mode conversion by the mode controlling means gives rise to the possibility that mode control states vary with each wavelength. In this case, in order to perform the control of the mode conversion collectively, a complicated control algorithm is required. In contrast, according to the free space optical receiver 800 of the present exemplary embodiment, it is possible to mitigate the wavelength dependence of each of the above-mentioned configuration means; therefore, it is possible to perform the receiving process stably in the free space optics (FSO).

FIG. 10 illustrates the case in which the wavelength group generating means 822 is disposed between the multimode transmission medium 221 and the mode converting means 222. However, the present exemplary embodiment is not limited to this, and the wavelength group generating means 822 may be disposed within the light collecting means 110 or between the light collecting means 110 and the multimode transmission medium 221. In this case, the stages following the multimode transmission medium 221 are configured to be parallelized, and the receiving operation for each wavelength group is similar to that by the configuration illustrated in FIG. 10.

The free space optical receiver 800 of the present exemplary embodiment is characterized by the configuration in which the wavelength group generating means 822 separates the laser light into wavelength groups in advance, instead of performing the wavelength separation processing collectively by the wavelength demultiplexing means 752 as illustrated in the seventh exemplary embodiment.

In conventional optical fiber transmission technologies, the wavelength division multiplexing is performed based on wavelength groups premised on a single mode fiber (SMF). In contrast, the free space optical receiver 800 of the present exemplary embodiment is configured to separate the laser light into wavelength groups with multimode states. This makes it possible to achieve the effect that the wavelength dependence of each configuration means can be mitigated. This effect cannot be obtained by conventional optical fiber transmission technologies.

The present invention is not limited to the above-described exemplary embodiments, and various modifications can be made within the scope of the invention described in the claims. It goes without saying that those modifications are included in the scope of the present invention.

REFERENCE SIGNS LIST 100, 200, 300, 400, 500, 600, 700, 800 free space optical receiver
101 laser beam
110 light collecting means
120 mode controlling means
130 single mode transmission media
140 light receiving means
220 end face
221 multimode transmission medium
222 mode converting means
223 mode separating means
230 single mode fiber
250 signal processing means
370, 471, 572 monitoring means
380, 480, 580, 680 controlling means
752 wavelength demultiplexing means
822 wavelength group generating means
s30 single mode beam
s40 received signal
s50 output signal
s61 received signal information
s71 detected intensity signal
s80 control signal
s81 mode control state signal

What is claimed is:

1. A free space optical receiver, comprising:
a light collecting unit configured to collect laser light having propagated through a free space transmission path;
a mode controlling unit configured to separate the laser light collected by the light collecting unit into a plurality of propagation mode beams depending on a wave-front fluctuation of the laser light and output the propagation mode beams;
a plurality of single mode transmission media configured to guide the plurality of propagation mode beams, respectively; and
a plurality of light receiving units configured to receive the plurality of propagation mode beams respectively through the plurality of single mode transmission media,
wherein the mode controlling unit produces multimode beams from the laser light and produces a plurality of propagation mode beams obtained by converting high-order mode beams included in the multimode beams into low-order mode beams by controlling the multimode beams.

2. The free space optical receiver according to claim 1, wherein the mode controlling unit includes
a multimode transmission medium configured to receive input of the laser light and output multimode beams;
a mode converting unit configured to control the multimode beams and produce a plurality of propagation mode beams obtained by converting high-order mode beams included in the multimode beams into low-order mode beams; and
a mode separating unit configured to separate the plurality of propagation mode beams and output each propagation mode beam.

3. The free space optical receiver according to claim 2, further comprising
a monitoring unit configured to monitor at least one of light intensity of the plurality of propagation mode beams output from the mode converting unit, each light intensity of the plurality of propagation mode beams output from the mode separating unit, and a state of a propagation mode of the laser light inputted into the mode converting unit; and
a controlling unit configured to control an operation of the mode converting unit dynamically based on a monitoring result of the monitoring unit.

4. The free space optical receiver according to claim 3, further comprising a signal processing unit configured to perform signal processing on a plurality of received signals output from the plurality of light receiving units and output an output signal synthesized from the plurality of received signals,
wherein the signal processing unit obtains the monitoring result from the controlling unit and performs the signal processing based on the monitoring result.

5. The free space optical receiver according to claim 4, further comprising a signal processing unit configured to perform signal processing on a plurality of received signals output from the plurality of light receiving units and output an output signal synthesized from the plurality of received signals,
wherein the signal processing unit notifies the controlling unit of received signal information of information obtained from the received signals, and
the controlling unit controls an operation of the mode converting unit based on the received signal information.

6. The free space optical receiver according to claim 3, further comprising a signal processing unit configured to perform signal processing on a plurality of received signals output from the plurality of light receiving units and output an output signal synthesized from the plurality of received signals, wherein the signal processing unit notifies the controlling unit of received signal information of information obtained from the received signals, and the controlling unit controls an operation of the mode converting unit based on the received signal information.

7. The free space optical receiver according to claim 1, further comprising a signal processing unit configured to perform signal processing on a plurality of received signals output from the plurality of light receiving units and output an output signal synthesized from the plurality of received signals.

8. The free space optical receiver according to claim 1, further comprising a wavelength demultiplexing unit, wherein the laser light is wavelength multiplexing signal light obtained by multiplexing a plurality of signal light beams each of which has a different wavelength from each other, and the wavelength demultiplexing unit demultiplexes the propagation mode beams that have been guided through the single mode transmission media for each different wavelength, and outputs mode beams respectively to the light receiving unit.

9. A free space optical receiver, comprising:

a light collecting unit configured to collect laser light having propagated through a free space transmission path;

a mode controlling unit configured to separate the laser light collected by the light collecting unit into a plurality of propagation mode beams depending on a wave-front fluctuation of the laser light and output the propagation mode beams;

a plurality of single mode transmission media configured to guide the plurality of propagation mode beams, respectively; and a plurality of light receiving units configured to receive the plurality of propagation mode beams respectively through the plurality of single mode transmission media, wherein the mode controlling unit includes a multimode transmission medium configured to receive input of the laser light and output multimode beams;

a mode converting unit configured to control the multimode beams and produce a plurality of propagation mode beams obtained by converting high-order mode beams included in the multimode beams into low-order mode beams; and a mode separating unit configured to separate the plurality of propagation mode beams and output each propagation mode beam.

10. The free space optical receiver according to claim 9, further comprising a monitoring unit configured to monitor at least one of light intensity of the plurality of propagation mode beams output from the mode converting unit, each light intensity of the plurality of propagation mode beams output from the mode separating unit, and a state of a propagation mode of the laser light inputted into the mode converting unit; and a controlling unit configured to control an operation of the mode converting unit dynamically based on a monitoring result of the monitoring unit.

11. The free space optical receiver according to claim 10, further comprising a signal processing unit configured to perform signal processing on a plurality of received signals output from the plurality of light receiving units and output an output signal synthesized from the plurality of received signals, wherein the signal processing unit obtains the monitoring result from the controlling unit and performs the signal processing based on the monitoring result.

12. The free space optical receiver according to claim 11, further comprising a signal processing unit configured to perform signal processing on a plurality of received signals output from the plurality of light receiving units and output an output signal synthesized from the plurality of received signals, wherein the signal processing unit notifies the controlling unit of received signal information of information obtained from the received signals, and the controlling unit controls an operation of the mode converting unit based on the received signal information.

13. The free space optical receiver according to claim 10, further comprising a signal processing unit configured to perform signal processing on a plurality of received signals output from the plurality of light receiving units and output an output signal synthesized from the plurality of received signals, wherein the signal processing unit notifies the controlling unit of received signal information of information obtained from the received signals, and the controlling unit controls an operation of the mode converting unit based on the received signal information.

14. The free space optical receiver according to claim 10, further comprising a signal processing unit configured to perform signal processing on a plurality of received signals output from the plurality of light receiving units and output an output signal synthesized from the plurality of received signals.

15. The free space optical receiver according to claim 9, further comprising a wavelength demultiplexing unit, wherein the laser light is wavelength multiplexing signal light obtained by multiplexing a plurality of signal light beams each of which has a different wavelength from each other, and the wavelength demultiplexing unit demultiplexes the propagation mode beams that have been guided through the single mode transmission media for each different wavelength, and outputs mode beams respectively to the light receiving unit.

16. The free space optical receiver according to claim 15, further comprising a wavelength group generating unit, wherein the wavelength group generating unit separates the laser light into a plurality of wavelength groups including a plurality of wavelengths, and the mode controlling unit controls a propagation mode for each wavelength group, separates the laser light into a plurality of propagation mode beams, and outputs the propagation mode beams.

17. The free space optical receiver according to claim 9, further comprising a signal processing unit configured to perform signal processing on a plurality of received signals output from the plurality of light receiving units and output an output signal synthesized from the plurality of received signals.

* * * * *